Dec. 16, 1969       R. E. BOWLES       3,483,889
FLUID CAPACITORS
Filed June 29, 1967
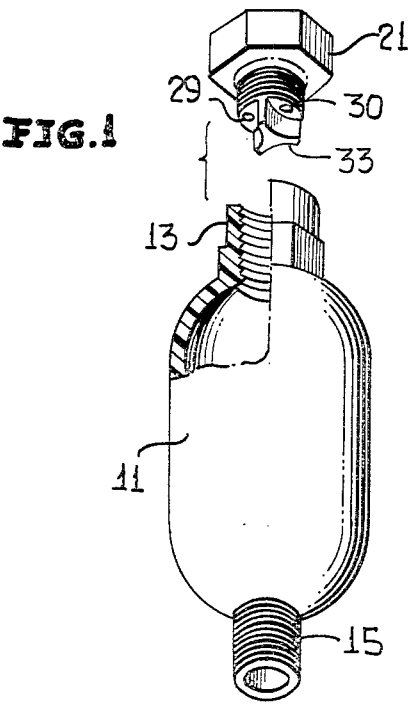
FIG.1
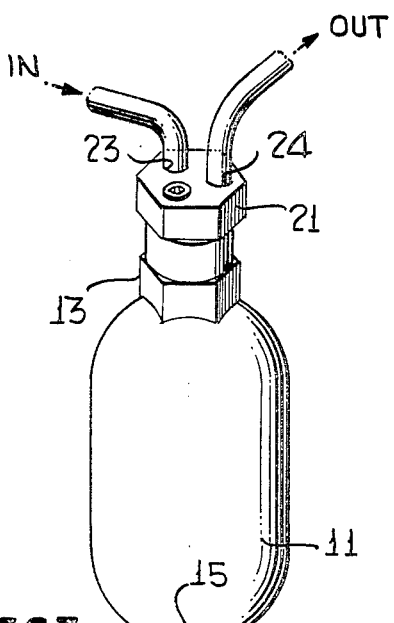
FIG.3
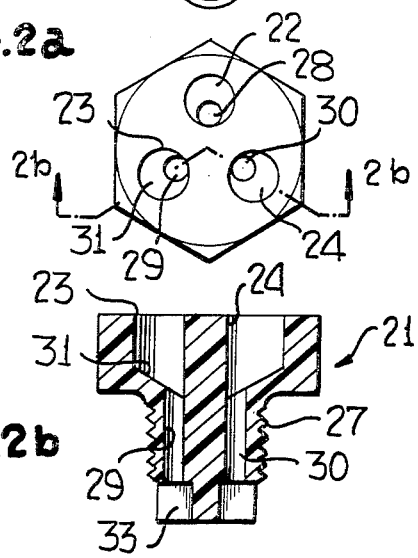
FIG.2a
FIG.2b
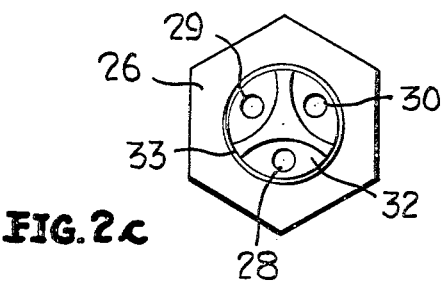
FIG.2c
INVENTOR
ROMALD E. BOWLES
BY *Hurvitz, Rose & Greene*
ATTORNEYS

United States Patent Office 3,483,889
Patented Dec. 16, 1969

3,483,889
FLUIDIC CAPACITORS
Romald E. Bowles, Silver Spring, Md., assignor to Bowles Engineering Corporation, Silver Spring, Md., a corporation of Maryland
Filed June 29, 1967, Ser. No. 650,106
Int. Cl. F15c 4/00
U.S. Cl. 137—575                   13 Claims

ABSTRACT OF THE DISCLOSURE

A fluid capacitor in the form of an elongated cylindrical enclosure having dished ends to avoid resonance at any one frequency, and having signal input and output ports which are immediately adjacent one another at one end of the cylinder. Isolation may be accomplished by providing adequate spacing between inlet and outlet ports, or a partition wall extending into the enclosure. One end of each cylinder is provided with an exteriorly threaded port and the opposite end with an internally threaded port, arranged to enable end to end threaded engagement of plural cylinders, if desired, to increase fluid capacitance.

Signal input and output ports are provided in a threaded plug for one of the ends, the plug including one or more isolating partitions extending inwardly of the enclosure, to isolate the ports from one another, and three ports are preferably provided in each plug, of which two may be signal input ports and one a signal output port, or two may be signal output ports and one a signal input port.

BACKGROUND OF THE INVENTION

This invention relates to improvements in fluidic capacitors. A conventional way to provide connections to fluid capacitors is to connect a closely coupled T-fitting to an opening in the capacitor. The input and output fluidic signals are then applied to respective branches of the T-fitting by means of appropriate fluid conduit. This technique has the disadvantage in that the T-fitting presents a significant resistance to fluid flow. The added resistance increases system losses, and the series combination of the added resistance and the capacitor distorts the amplitude versus frequency characteristic of the system. An additional problem with a T-fitting is that under different flow conditions the capacitor will be subjected to different types of pressure. Specifically, at times the capacitor will be subjected to total pressure, at other times to signal pressure and at still other times wake pressure. The differences between these various pressures vary materially particularly in high pressure systems. For instance, it is possible for pressures to vary between a total pressure of 2000 p.s.i. and a wake pressure of 4 p.s.i. in the system. The T-fitting is also quite frequency sensitive under certain flow conditions.

Another conventional manner of providing connections to a localized portion of a capacitor periphery comprises provision of individual adjacent inlet and outlet ports with separate fluid conduits connected to each port. The defect in this technique is that a stream of input fluid entering the capacitor through the inlet port tends to entrain fluid from the region surrounding the egress orifice of the inlet port. The output flow through the adjacent outlet port will therefore be affected by the input flow rate, which detracts from the smoothing function of the capacitor. Further acoustic signal coupling between input and output channels often produces by-passing of the capacitor and its effective elimination from the circuit at certain frequencies.

It is an object of the present invention to provide a fluidic capacitor having adjacent input and output connections which do not substantially increase system flow resistance and wherein interaction between input and output flows and signals are substantially minimized.

A problem area in prior art fluidic capacitors relates to resonances. If one considers a cylindrical capacitor having an input signal introduced at one of the endcaps of a capacitor, it follows, if the endcaps are flat, that the volume has a very definite resonant frequency established by its length, i.e., the distance between the endcaps, and the speed of sound within the tank for a compression fluid, or by its length and the effective speed of sound, which as taken includes the effect of resiliency of the tank in the case of comparatively incompressible fluids.

The introduction of signals at or near that natural or characteristic frequency will result in a longitudinal wave along the length of the major axis of the cylinder which introduces different signals into the output line dependent upon the lengthwise location of its connections to the capacitor. A resonance condition will amplify these particular signals in a fashion different from the amplification at other frequencies. It is apparent, for example, that an output connection at the same end as the input signal connection would exhibit a different time history than would an output connection at the far end of the tank. Further, if these endcaps are flat, one obtains a very sharp resonant frequency characteristic. Consequently, a configuration wherein the endcaps are dished so as to provide different characteristic lengths for the container dependent upon radial distance from the axis of this container offers advantages in that resonant frequencies are less pronounced and are smeared to some extent over a region dependent upon the range of lengths included in the cylinder. By using dished endcaps, a maximum length is provided on the axis and a minimum length near the circumference of the endcaps, or vice versa, depending upon direction of dishing. In the case of a cylinder, if the length is large compared to the diameter, then an input pulse introduced at one end will become a plain wave as it travels down the length of the cylinder.

One may utilize a spherical container as a minimum length cylindrical container with dished ends. This offers significant advantages as a fluidic capacitor in that a signal introduced at one location on the periphery of the sphere will have many reflective lengths to minimize the characteristic frequency response for any one frequency, when one considers connection of this capacitor to output signal paths and multiple input signal paths. The characteristic frequency would be in this case, dependent upon the diameter if a radial oscillation were established, however, if the input and output connections are on the same hemisphere of this sphere, resonance will be minimized, as opposed to the situation of connections made at diametrically opposed positions. For example, if the same frequency were introduced to diametrically opposite locations on a sphere and were introduced in phase, a radial oscillation mode could be established. This is less likely to occur if all connections are made in the same hemisphere.

U.S. patent to Horton et al. No. 3,185,166 issued May 25, 1965 and entitled "Fluid Oscillators," teaches the separation of widely separated signal input and output ports of a capacitor and the utility of a dished capacitor. This patent lacks disclosure of the physical structure of a capacitor, including facility for selective cascading of capacitors and of plugs containing isolated input and output ports to an enclosure employed as a capacitor volume.

SUMMARY OF THE INVENTION

In the first aspect of the present invention, a fluidic capacitor having adjacent inlet and outlet ports is provided with a partition member extending interiorly of the capacitor volume from a location on the capacitor interior wall between the two ports. The partition extends sufficiently far from the wall to prevent acoustic coupling between the ports prior to dispersal of the input fluid stream and prevent entrainment of fluid in the immediate vicinity of the outlet port by a stream entering the capacitor via the inlet port. As a result, the output signal is a function of the fluid pressure in the capacitor rather than of the input flow rate and variations in input flow rate. Alternatively, the adjacent inlet and outlets may be separated by at least twice the inlet port diameter, such separation having been found to substantially minimize entrainment of output fluid by input flow and acoustic coupling between the inlet and outlet ports.

In a preferred embodiment, the partition inlet and outlet ports are made a part of a novel fitting which is adapted to be inserted in a single capacitor opening. The latter opening is also adapted to receive a tubular extension from an additional capacitor, so that the capacity of the first-mentioned capacitor may be supplemented by the capacity of the additional capacitor.

In another aspect of this invention, undesirable resonance effects produced by pressure wave reflections interiorly of a fluidic capacitor are substantially minimized by curving interior wall surfaces of the capacitor. Specifically, if an interior wall is disposed so as to provide a reflective surface in a path between an input port and an output port, that wall is curved to disperse the reflected pressure waves and thus to avoid resonances.

In a specific embodiment of this latter aspect of the invention, a cylindrical capacitor having dished endwalls is provided. The direction of curvature of the endwalls may be outward or inward, and in either case, the otherwise planar wave reflections are smeared.

The above and still further objects, features and advantages of the present invention will become apparent upon consideration of the following detailed description of one specific embodiment thereof, especially when taken in conjunction with the accompanying drawing, wherein:

FIGURE 1 is a view in perspective of a capacitor constructed in accordance with the present invention;

FIGURES 2a, 2b, and 2c are top, front section and bottom views of the novel connector employed to provide coupling to the capacitor of FIGURE 1; and FIGURE 3 is a view in perspective of two capacitors coupled to one another in accordance with the principles of this invention.

DESCRIPTION OF THE PREFERRED EMBODIMENTS

Referring specifically to FIGURE 1, there is illustrated a fluidic capacitor 11 constructed in accordance with one aspect of this invention. Capacitor 11 is substantially cylindrical in shape and has endwalls which are curved concave inwardly of the capacitor. Open tubular necks 13 and 15 extend from opposite endwalls of the capacitor 11. Neck 13 is internally threaded to receive a connector 21 to be described in detail below. Neck 15 is externally threaded so as to be received by a neck 13 of another capacitor, thereby permitting a plurality of capacitors to be cascaded as will subsequently be described in relation to FIGURE 3. Alternatively, neck 15 may be closed by an endcap such as element 14.

Referring now to FIGURES 2a–2c, there is illustrated a connector 21 in the form of a bolt having a hexagonal head 26 and a cylindrical threaded portion 27, the latter being adapted to engage internally threaded port 13 of capacitor 11. The cylindrical ports 22, 23 and 24 are defined in and extend through the length of head 26, each port terminating in a respective orifice 28, 29 and 30 defined in and extending through threaded portion 27. The ports and their respective orifices thereby provide three flow paths extending throughout the length of connector 21. The cylindrical walls of ports 22, 23, and 24 are threaded for the purpose of receiving appropriately threaded fluid fittings which conduct fluid signals to and from capacitor 11. A shoulder 31, which defines the end of port 23 and the beginning or orifice 29, is sloped so as to facilitate fluid flow between the port and orifice. Similarly sloped shoulders are provided for ports 22 and 24.

A partition 33 extends from a surface 32 which defines the bottom end of a threaded cylinder section 27. Partition 33 comprises three equally spaced legs extending radially to the periphery of surface 32 from the center of the latter surface so as to provide a generally Y-shaped configuration. The legs of partition 33 each extend between a respective pair of orifices 28, 29 and 30 so that the orifices are separated from one another by respective partition legs. The length to which partition 33 extends from surface 32 must be sufficient to prevent acoustic coupling between the orifices and to prevent entrainment of fluid entering any one of orifices 28, 29 and 30 by a stream of fluid egressing from another of the orifices. Thus, if port 23 and orifice 29 provide an input fluid stream, the flow therefrom would not entrain output fluid entering orifices 28 or 30 because of the presence of partition 33.

The particular embodiment illustrated in FIGURE 2 is not to be construed as limiting the scope of this invention to a three port capacitor or to the particular configuration of connector 21. The concept of partitioning adjacent orifices in a fluid capacitor is clearly applicable to any number of such orifices and to many forms of connector configuration, including a connector constructed integrally of the capacitor.

As an alternative to the provision of a partition as described above, it has been found that by separating the input orifices from the output orifice by at least twice the diameter of the input orifice a substantial reduction in entrainment of output fluid results. Still another alternative is to angularly dispose the orifices relative to one another so that while ports 22 and 23, for example, may be adjacently disposed, their respective orifices 28 and 29 are separated by a considerably larger distance at surface 32.

Referring now to FIGURE 3 of the drawings, there is illustrated a pair of capacitors 11 and 11' connected in such manner as to add their effective capacities. Specifically, capacitor 11 is substantially identical to the similarly designated capacitor of FIGURE 1. Connector 21 is threadedly engaged by neck 13 of capacitor 11 and has an input tube and an output tube connected to ports 23 and 24 respectively, port 22 being blocked for purposes of the following description. Neck 15 of capacitor 11 is threadedly received by neck 13' of capacitor 11'. Capacitor 11' is similar to capacitor 11 but is sealed at its end opposite neck 13' by a cap 14.

The effect of connecting capacitor 11' to capacitor 11 as described is to increase the capacity of capacitor 11 by that of capacitor 11'. The flow path provided between the capacitors by neck 15 of capacitor 11 is of necessity substantially larger than the flow paths provided by the orifices 28, 29 and 30 in connector 21. Thus, while filling capacitor 11 input fluid is also conducted to capacitor 11' via neck 15 rather than through an output orifice at connector 21 due to the substantially smaller flow resistance presented by neck 15. Any number of capacitors may be additively connected in this manner to achieve a desired capacity.

In another aspect of this invention, the curved endwalls provided for cylindrical capacitor 11 of FIGURE 1 serve to disperse reflected pressure waves and thereby minimize resonances. Specifically, and the following holds true whether neck 15 is provided or its respective endwall is sealed, consider an input pressure signal applied to capacitor 11 at neck 13 via port 29 in connector 21. The pressure wave created thereby travels longitudinally in the capacitor until it reflects from the opposite endwall. If such endwall were flat, the pressure wave would be reflected as a planar wave and upon re-traversing the capacitor length would reflect again as a planar wave, thus giving rise to resonance phenomena at one frequency.

However, the curvature of the capacitor endwalls precludes reflection of a planar wave which is smeared or dispersed in accordance with the curvature of the endwall, thus avoiding resonance.

Although the capacitors of FIGURE 3 are illustrated as being of the same size, different size units may be employed. The larger element of any given pair of elements is always closest to the input pipe to insure proper additive effects without time delay. The size distribution may be selected to conform to any base. For instance, if a binary arrangement is used any capacitor from 1 to 7 may be obtained with only three units of volumes 1, 2 and 4.

I claim:

1. A fluidic capacitor operable with a working fluid and comprising an enclosure for providing a working fluid output signal as a function of the pressure inside said enclosure, said enclosure comprising at least one fluid inlet port for receiving said working fluid and having an egress orifice for issuing said working fluid into said enclosure; at least one fluid outlet port for providing said output signal and having an ingress orifice for conducting working fluid outflow from said enclosure, said ingress and egress orifices being disposed adjacent one another; and isolation means for minimizing the effects of acoustic coupling and mutual entrainment between working fluid flowing into said ingress orifice and working fluid issued by said egress orifice, said isolation means comprising a partition member extending inwardly of said enclosure from a location on an interior wall of said enclosure between said ingress and egress orifices.

2. The fluidic capacitor according to claim 1 wherein said inlet and outlet ports and said partition member are part of a connector which is selectively engageable with an opening in said enclosure.

3. The fluidic capacitor according to claim 2 wherein said opening in said enclosure is internally threaded and said connector is externally threaded to receive said connector.

4. The fluidic capacitor according to claim 3 further comprising a tubular passage extending from said capacitor, said tubular passage being externally threaded so as to be capable of threadedly engaging said opening in said enclosure.

5. The fluidic capacitor according to claim 1 wherein the interior surface of said enclosure disposed opposite said ingress and egress orifices is dished to smear pressure waves reflected therefrom.

6. The fluidic capacitor according to claim 5 wherein said enclosure is of substantially cylindrical configuration and has dished endwalls, said inlet and outlet ports being located in one of said endwalls and said interior surface comprising the other of said endwalls.

7. The fluidic capacitor according to claim 6 wherein said input and output ports and said isolation means comprise a connector which is externally threaded, and wherein said enclosure has an opening in said one of said endwalls which is internally threaded to receive said connector.

8. The fluidic capacitor according to claim 7 wherein said other endwall has a tubular passage extending therefrom, said passage being substantially larger than said ingress orifice, said tubular passage being externally threaded, and further comprising a second fluidic capacitor having an interiorly threaded opening for engaging the threaded tubular passage extending from the first-mentioned fluidic capacitor.

9. A fluidic capacitor comprising an enclosure, said enclosure including opposed ports, one of said ports being internally threaded, a nipple extending outwardly of said enclosure and defining the other of said ports, said nipple being externally threaded to threadedly match the threads of said one of said ports and having an external diameter matching the internal diameter of said one of said ports, and an endcap threadedly engaging said one of said ports, said endcap including at least two ports extending through said endcap to said enclosure.

10. The combination according to claim 9 wherein said endcap includes at least two ports and means for isolating said two ports from one another in respect to fluid in process of flowing into and out of said two ports.

11. The combination according to claim 10 wherein said means for isolating is a partition wall extending from said endcap into said enclosure.

12. The combination according to claim 9 wherein said endcap includes three ports extending through said endcap to said enclosure, and means for isolating said three ports from one another with respect to fluid in process of flowing into and out of said three ports.

13. The combination according to claim 12 wherein said means for isolating is a set of partition walls extending from said endcap into said enclosure.

References Cited

UNITED STATES PATENTS

| 1,697,344 | 1/1929 | Campbell | 181—47 |
| 1,885,218 | 11/1932 | Berman | 137—588 |
| 2,333,310 | 11/1943 | Greening | 137—588 X |
| 2,896,862 | 7/1959 | Bede | 137—592 X |

M. CARY NELSON, Primary Examiner

WILLIAM R. CLINE, Assistant Examiner

U.S. Cl. X.R.

137—81.5, 590